United States Patent

[11] 3,562,498

| [72] | Inventors | Peter James Darling<br>Biggin Hill;<br>Albert Norman John Uren, Bromley,<br>England |
|---|---|---|
| [21] | Appl. No. | 696,319 |
| [22] | Filed | Jan. 8, 1968 |
| [45] | Patented | Feb. 9, 1971 |
| [73] | Assignee | National Research Development<br>Corporation<br>London, England |
| [32] | Priority | Jan. 9, 1967 |
| [33] | | Great Britain |
| [31] | | 1067/67 |

[54] REVERSIBLE COUNTER APPARATUS
5 Claims, 4 Drawing Figs.

[52] U.S. Cl. .................................................. 235/92,
235/151.11, 356/106
[51] Int. Cl. ..................................................... G06m 3/14,
H03k 21/06; G06n 1/272
[50] Field of Search .......................................... 235/92.60,
92.66, 92.28, 92.62, 92.53, 151.11, 154; 318/28;
328/44; 307/222

[56] References Cited
UNITED STATES PATENTS

| 3,255,378 | 6/1966 | Kaufmann ................... | 315/84.6 |
| 3,165,680 | 1/1965 | Morrison ...................... | 318/28 |
| 3,408,484 | 10/1968 | Stutz ........................... | 235/92 |
| 2,833,476 | 5/1958 | Hayes ........................... | 235/92 |
| 3,015,064 | 12/1961 | Husted .......................... | 324/83 |
| 2,656,106 | 10/1953 | Stabler ........................... | 235/92 |
| 2,918,215 | 12/1959 | Root ............................... | 235/92 |

Primary Examiner—Maynard R. Wilbur
Assistant Examiner—Robert F. Gnuse
Attorney—Cushman, Darby and Cushman ABSTRACT: A reversible counter apparatus for counting complete cycles of sequential changes in input signals which pass through a sequence of first, second, third and fourth distinct conditions in each complete cycle of changes, for keeping an accurate count of complete cycles of changes in adverse conditions. It comprises a first sequential gating means for producing an output whenever the input signals change from the fourth condition to the first condition with no intervening occurrence of the second condition, a second sequential gating means for producing an output whenever the input signals change from the first condition to the fourth condition with no intervening occurrence of the third condition, first bistable means connected to both gating means, second bistable means connected to the first bistable means and having inputs connected to set it in response to any occurrence of the third condition while the first bistable means is set and to reset it on any occurrence of the third condition and also whenever said first bistable means is reset, third bistable means connected to the first bistable means and having inputs connected to set it on any occurrence of the second condition while the first bistable means is reset and to reset it on any occurrence of the third condition and also whenever the first bistable means is set, and a reversible counter connected to the second and third bistable means. The invention is applicable to laser range finders and distance-measuring apparatus using fringe-counting techniques. Visual indicators may be provided to allow incremental parts of cycles to be measured.

REVERSIBLE COUNTER APPARATUS

The present invention relates to logical circuits for use with a reversible counter device, in connection with measuring apparatus of a type producing measurement-indicating signals which are periodic functions of a measurement such that a monotonic change in the measurement may cause the signals to pass through a sequence of at least four distinctive conditions. In such apparatus increments of the measurement which correspond to changes of fractions of a period may be deduced from changes in the signal values, and larger increments may be measured by counting the complete cycles of sequential changes by means of a reversible counting apparatus. The measurement signals may be a pair of waveforms differing by a given phase displacement, and each distinctive condition may be a combination of values of the two signals.

When the measurement is subject to fluctuations or oscillations, and especially when it is a very sensitive measurement, cumulative errors may easily occur in the counting of the cycles of the measuring signals. The present invention is intended to provide a means for reducing the probability of occurrence of such errors.

According to the present invention there is provided a reversible counter apparatus for counting complete cycles of sequential changes in input signals which pass through a sequence comprising at least first, second, third and fourth distinct conditions in each complete cycle of changes, the apparatus including a first bistable element arranged to be put on whenever the input signals change from the fourth condition to the first condition with no intervening occurrence of the second condition and to be put off whenever the input signals change from the first condition to the fourth condition with no intervening occurrence of the third condition, a second bistable element arranged to be put off whenever the first bistable element is put off and also on any occurrence of the second condition and arranged to be put on by any occurrence of the third condition while the first bistable element is on, a third bistable element arranged to be put off whenever the first bistable element is put on and also on any occurrence of the third condition and arranged to be put on by any occurrence of the second condition while the first bistable element is off, means for initiating a count in one direction on any occurrence of the first condition while the second bistable element is on, and means for initiating a count in the reverse direction on any occurrence of the fourth condition while the third bistable element is on.

In order that the invention may be clearly understood, embodiments and an application thereof will now be described, by way of example only, with reference to the accompanying drawings of which:

Figure 1:
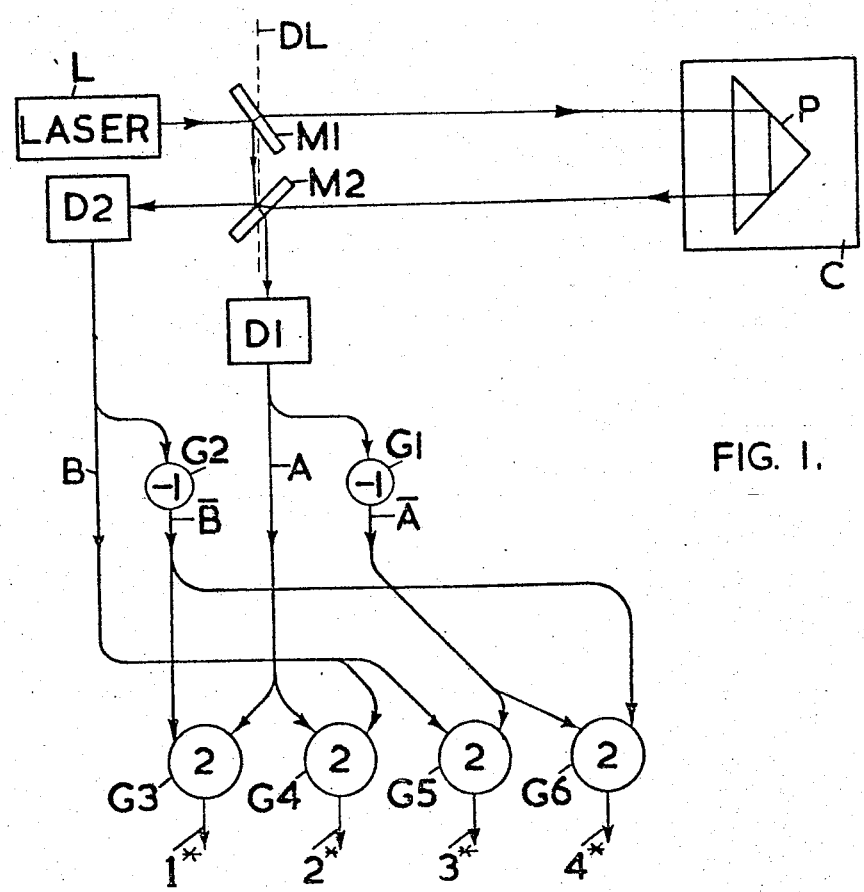
FIG. 1 is a schematic diagram of a distance measuring apparatus.
Figure 2:
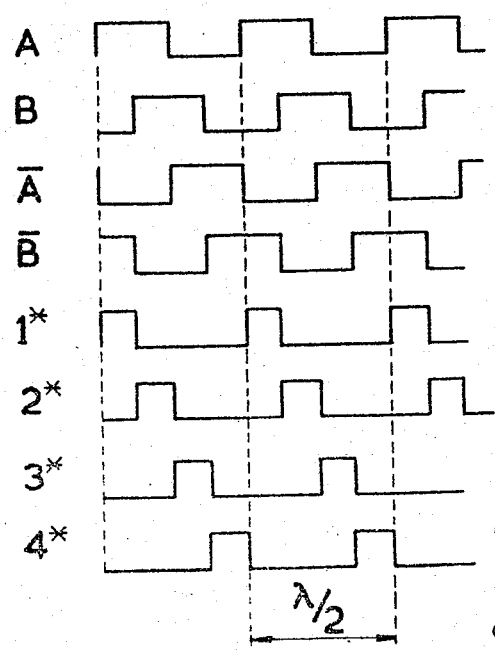
FIG. 2 is a graphical representation of the relationship between the signals produced by the apparatus of FIG. 1 and the distance measured by it.

FIG. 1 shows a distance measuring apparatus including a laser L, two semitransparent mirrors M1 and M2 of the coated type, a reflecting prism P mounted on a movable carriage C, and two detectors D1 and D2. A beam of electromagnetic radiation from the laser is split into two beams at the mirror M1, of which one (the direct beam) goes directly to the mirror M2 and the other goes to the mirror M2 via the prism P. A part of the beam from the prism P is refracted through the coating of the mirror M2 and interferes with a reflected part of the direct beam on a path directed towards the detector D2. Another part of the direct beam is refracted through the coating of the mirror M2 and interferes with a reflected part of the beam from the prism P, along a path directed towards the detector D1. The coatings of the mirrors M1 and M2 are arranged so that the path difference between the pair of interfering rays directed at the detector D2 is always a quarter wavelength greater than the path difference between the pair of interfering rays directed at the detector D1. An output signal A from the detector D1 is applied to an inverter 61 to provide an inverted output signal $\bar{A}$. An output signal B from the detector D2 is applied to an inverter 62 to provide an inverted output signal $\bar{B}$. Four two-input AND gates 63, 64, 65, and 66 are connected to receive different pairs of the signals A, B, $\bar{A}$ and $\bar{B}$, so that their outputs provide signals 1", 2", 3"and 4"respectively. The carriage C is slidable parallel to the beams of radiation between the mirrors M1 and M2 and the prism P, and incremental movements of the carriage C cause sequential changes in the signals A, B etc. FIG. 2 shows the relationships of the various signals to each other and to the position of the carriage C. Abscissae represent distances of the carriage from a datum line DL at an arbitrary position to the left of the carriage C in FIG. 1, and ordinates represent voltages of the signals indicated by the references. It will be noted that the signals produced in the detectors D1 and D2 are amplified and clipped therein so that the outputs A and B are substantially square wave functions of distance. If the carriage C is moved half a wavelength to the right in FIG. 1, the length of the indirect path is increased by one wavelength, and the signals pass through one complete cycle, as shown between consecutive broken vertical lines on FIG. 2. The signal B is a quarter cycle ahead of the signal A. The outputs 1", 2", 3"and 4"are successively energized when the carriage C is moved monotonically through consecutive one-eighth wavelength increments of distance, which cause quarter-cycle increments in the signals A and B.

Figure 3:
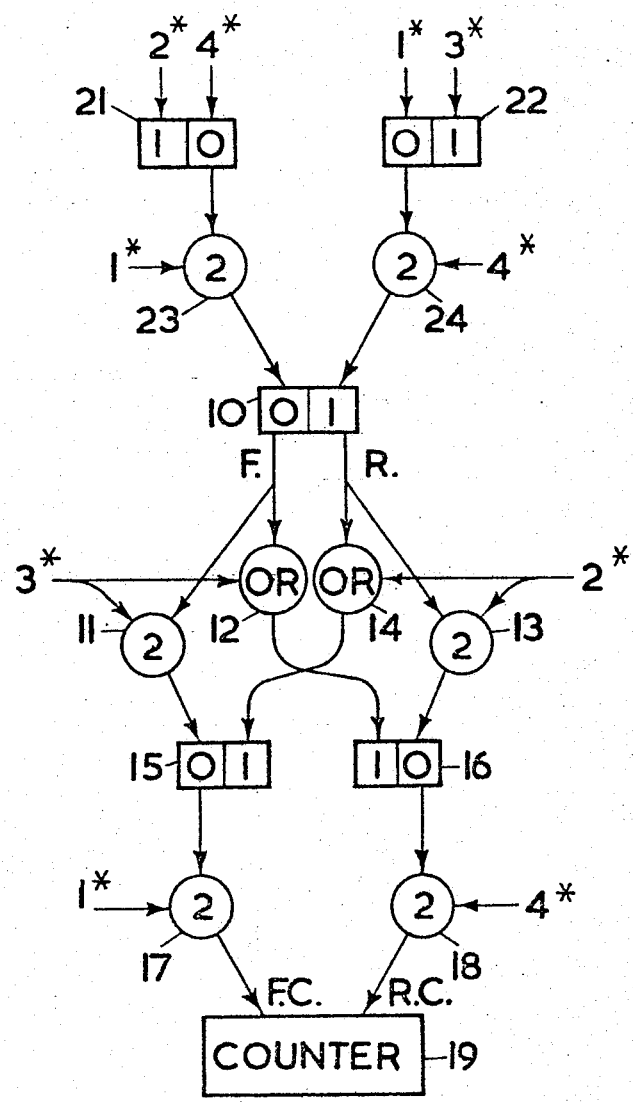
FIG. 3 is a schematic circuit diagram of a logical circuit for receiving outputs of the apparatus of FIG. 1 and driving a reversible counter.

FIG. 3 shows a first bistable element 10 with complementary outputs. The output of the element 10 which is energized when the element 10 is set (that is to say, on, or in the 0 state) is connected to inputs of an AND gate 11 and an OR gate 12. The output of the element 10 which is energized when the element 10 is reset (that is to say, off, or in the 1 state) is connected to inputs of an AND gate 13 and an OR gate 14. Outputs of the AND gates 11 and 13 are respectively connected to setting inputs of a second bistable element 15 and a third bistable element 16. Outputs of the OR gate 12 and 14 are respectively connected to resetting inputs of the third and the second bistable elements 16 and 15. Outputs of the second bistable element 15 and the third bistable element 16 which are energized when the associated elements are set are respectively connected to inputs of AND gates 17 and 18. The output of the AND gate 17 is connected to a forward-counting input of a reversible counter 19. The output of the AND gate 18 is connected to a reverse-counting input of the reversible counter 19.

Means for driving the first bistable element 10 are provided in the form of further bistable elements 21 and 22 and AND gates 23 and 24. Outputs of the bistable elements 21 and 22 which are energized when the associated elements are set are respectively connected to inputs of the AND gates 23 and 24, and the outputs of these AND gates 23 and 24 are respectively connected to a setting input and a resetting input of the first bistable element 10.

The outputs 1", 2", 3"and 4"from the apparatus of FIG. 1 are connected to various inputs of the logical circuit of FIG. 3 as will now be described. The output 1" is connected to inputs of the AND gates 17 and 23 and to a setting input of the bistable element 22. The output 2" is connected to inputs of the gates 13 and 14 and to a resetting input of the bistable element 21. The output 3" is connected to inputs of the gates 11 and 12 and to a resetting input of the bistable element 22. The output 4" is connected to inputs of the AND gates 18 and 24 and to a setting input of the bistable element 21.

In operation the counter 19 is required to display the distance of the carriage C from the datum line DL, reversibly counting the complete cycles of sequential signal changes which are caused by half-wavelength incremental changes in the position of the carriage. A signal 4"which will occur when the carriage approaches the end of a half-wavelength increment will put the bistable element 21 on. If this is followed by a 1" signal, with no intervening occurrence of a 2" signal, showing that the carriage has crossed the end of the increment going in the direction of increasing distance, the gate 23 will reduce an output which will put the first bistable element 10 on. If a 2" signal intervenes as the result of a reversal of the motion of the carriage C, the bistable element 21 is reset and the first bistable element 10 is not put on even if the 2" signal is followed by a 1" signal. The putting on of the first bistable element 10, when it occurs, indicates that the carriage C has begun to traverse a new half-wavelength distance increment, in the direction of increasing distance. If, while the first bistable element 10 is on, a 3" signal is received, the second bistable element 15 is put on, indicating that the the carriage C has reached the third quarter of the new distance increment still travelling in the direction of increasing distance. The occurrence of the 1" signal while the second bistable element 15 is on then indicates that the new distance increment has been completely traversed and by operating the gate 17 initiates a unit forward count in the counter 19.

The occurrence of the 1" signal puts the bistable element 22 on, and if it is followed by a 4" signal with no intervening 3" signal then the first bistable element 10 will be put off. This indicates that the carriage C has begun to traverse a new half-wavelength distance-increment, in the direction of decreasing distance. If, while the first bistable element 10 is off, a 2" signal occurs, then the gate 13 will operate to put the third bistable element 16 on, indicating that the carriage C has traversed more than half of the new distance increment, still travelling in the direction of decreasing distance. The occurrence of a 4" signal while the third bistable element 16 is on then indicates that the new distance increment has been completely traversed, and by operating the gate 18 initiates a unit reverse count in the counter 19.

When the apparatus of FIG. 1 is subject to environmental vibrations, as it will be in practice unless special precautions are taken, the vibrations will cause oscillations of the distance measured. The signals 1", 2", 3", and 4" may therefore be produced in a variety of sequences which may frequently cause one or more of the bistable elements 10, 15, 16, 21 and 22 to be reset, interrupting sequences of actions of the sort described above. To avoid spurious counts, the second bistable element 15 is put off whenever the first bistable element 10 is put off and the third bistable element 16 is put off whenever the first bistable element 10 is put on. This is arranged by the connections from the element 10 to the OR gates 12 and 14. The system will then keep an accurate count of the increments completely traversed, unless the vibration is so violent as to involve signal changes at a rate close to or above the maximum operating speed of the bistable elements and gates.

Figure 4:
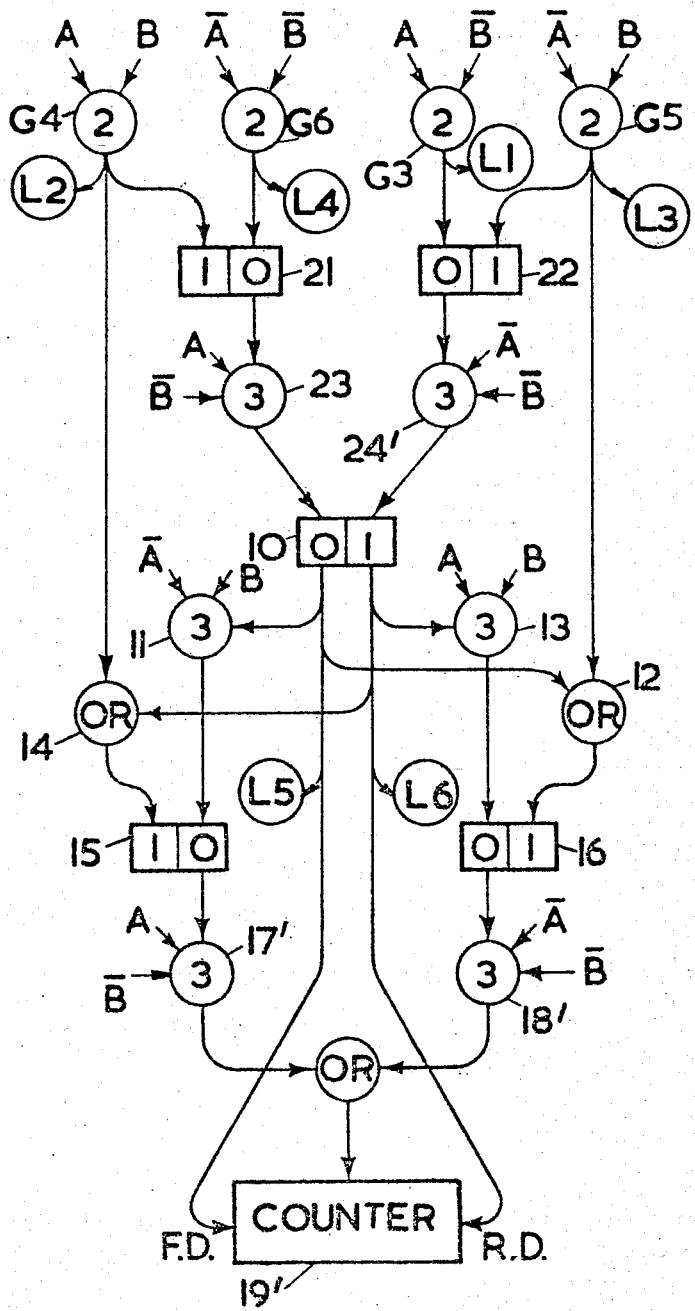
FIG. 4 is a schematic circuit diagram of an alternative form of the logical circuit of FIG. 3.

It should be clearly understood that FIGS. 1 and 2 and the associated descriptions have been included only as one example of the usefulness of the invention, and to show one way in which a set of signals suitable for driving the circuit of FIG. 3 may be obtained. Such signals can in other applications be derived from other apparatus, for instance apparatus utilizing Moire fringe effects produced by relative movements of gratings. The invention is not necessarily limited to applications in which the measurement-indicating signals are square-wave functions of distance, or to applications wherein each cycle of the measurement-indicating signals comprises exactly four, and only four, distinct combinations of signal values. Various other possible modifications will now be obvious to persons skilled in the art. For instance, some or all of the gates 11, 13, 17, 18, 23 and 24 can be replaced by multiinput gates having inputs connected to receive appropriate pairs of the measurement-indicating signals, A, B, $\bar{A}$ and $\bar{B}$. An alternative embodiment utilizing multiinput gates is shown in FIG. 4. Parts of FIG. 4 which correspond to similar parts in FIG. 3 are given similar references in both drawings. It will be seen that the gate 23 of FIG. 3, for instance, is in FIG. 4 replaced by a three-input gate $23^1$ of threshold three, two of its inputs being connected to receive the signals A and $\bar{B}$ respectively. The simultaneous concurrence of the signals A and $\bar{B}$ is the combination which in the apparatus of FIG. 1 produces the signal 1"; hence the gate $23^1$ fulfills the same function as the gate 23 of FIG. 3. FIG. 4 also shows an alternative form of reversible counter $19^1$, which has a single counting input fed through an OR gate 25 from the outputs of gates $17^1$ and $18^1$, and in which the direction of counting is determined by outputs of the first bistable element 10 so that a count will be forward if the element 10 is on, or reverse if the element 10 is off.

A useful addition to the invention is the provision of a visual indicator or indicators showing the direction of counting and four visual indicators arranged to be operated by the first, second, third and fourth distinct combinations of the input signals respectively. These indicators may take the form of lamps L1 to L6 driven from the outputs of the bistable element 10 and the gates 13, 14, 15 and 16 respectively. Such indicators will enable an operator to detect quarter-cycle increments, and to make corrections for their cumulative effect.

We claim:

1. A reversible counter apparatus for counting complete cycles of sequential changes in input signals which pass through a sequence comprising at least first, second, third and fourth distinct conditions in each complete cycle of changes, said apparatus comprising:

first sequential gating means for producing an output whenever the input signals change from the fourth condition to the first condition with no intervening occurrence of the second condition;

second sequential gating means for producing an output whenever the input signals change from the first condition to the fourth condition with no intervening occurrence of the third condition;

first bistable means, having a setting input connected to receive the output of said first sequential gating means and a resetting input connected to receive the output of said second sequential gating means;

second bistable means, having setting input means connected to said first bistable means for putting said second bistable means into a set condition in response to any occurrence of the third condition of the input signals while said first bistable means is set, and having resetting input means connected to said first bistable means for putting said second bistable means in to a reset condition on any occurrence of the second condition of the input signals and also whenever said first bistable element is reset;

third bistable means, having setting input means connected to said first bistable means for putting said third bistable means into a set condition on any occurrence of the second condition of the input signals while said first bistable means is reset, and having resetting input means connected to said first bistable means for putting said third bistable means into a reset condition on any occurrence of the third condition of the input signals and also whenever said first bistable means is set; and reversible counter means, connected to said second bistable means and said third bistable means, for making a count in one direction in response to any occurrence of the first condition of the input signals while said second bistable means is set and making a count in the reverse direction in response to any occurrence of the fourth condition of the input signals while said third bistable means is set.

2. Reversible counter apparatus as in claim 1, also comprising:

first condition-sensitive means for providing an output in response to any occurrence of the first condition of the input signals;

second condition-sensitive means for providing an output in response to any occurrence of the second condition of the input signals;

third condition-sensitive means for providing an output in response to any occurrence of the third condition of the input signals;

fourth condition-sensitive means for providing an output in response to any occurrence of the fourth condition in the input signals;

wherein the said first sequential gating means comprises:
fourth bistable means having a setting input connected to receive the output of said fourth condition-sensitive means and a resetting input connected to receive the output of said second condition-sensitive means; and
coincidence gating means connected to said fourth bistable means for producing the said output in response to any occurrence of the first condition of the input signals while said fourth bistable means is set, wherein the said second sequential gating means comprises;
fifth bistable means having a setting input connected to receive the output of said first condition-sensitive means and a resetting input connected to receive the output of said third condition-sensitive means, and
coincidence gating means connected to said fifth bistable means for producing the said output in response to any occurrence of the fourth condition of the input signals while said fifth bistable means is set.

3. A reversible counter apparatus for counting complete cycles of sequential changes of at least two variable input signals which pass through a sequence comprising at least first, second, third and fourth distinct combinations of values of the said variable input signals, comprising apparatus as in claim 10 and wherein each of the said condition-sensitive means comprises a coincidence gate circuit connected to receive at least two of said variable input signals.

4. A reversible counter apparatus as in claim 2 and also comprising:
first, second, third and fourth visual indicators respectively connected to the first, second, third and fourth condition-sensitive means for indicating the occurrence of the first, second, third and fourth conditions respectively; and
visual indicator means for displaying the state of the first bistable circuit.

5. Reversible counter apparatus as in claim 2 wherein:
said second bistable means comprises a bistable element and setting input means in the form of a coincidence gate circuit having one input connected to said first bistable means, another input connected to receive the output of said third condition-sensitive means, and an output connected to the said bistable element; and
said third bistable means comprises a bistable element and setting input means in the form of a coincidence gate circuit having one input connected to said first bistable means, another input connected to receive the output of said second condition-sensitive means and an output connected to the said bistable element.